(12) United States Patent
Wang (10) Patent No.: US 10,672,313 B2
(45) Date of Patent: Jun. 2, 2020

(54) ARRAY SUBSTRATE, METHOD FOR DETERMINING ABNORMAL DISPLAY THEREOF, DISPLAY PANEL AND DISPLAY DEVICE

(71) Applicant: BOE Technology Group Co., Ltd., Beijing (CN)

(72) Inventor: Zhicheng Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 37 days.

(21) Appl. No.: 16/103,248

(22) Filed: Aug. 14, 2018

(65) Prior Publication Data

US 2019/0266931 A1  Aug. 29, 2019

(30) Foreign Application Priority Data

Feb. 23, 2018 (CN) .......................... 2018 1 0154536

(51) Int. Cl.
*G09G 3/00* (2006.01)
*G09G 3/36* (2006.01)
*G09G 3/3225* (2016.01)
*G02F 1/1362* (2006.01)

(52) U.S. Cl.
CPC ........... *G09G 3/006* (2013.01); *G09G 3/3225* (2013.01); *G09G 3/3648* (2013.01); *G02F 2001/136254* (2013.01)

(58) Field of Classification Search
CPC .... G09G 3/006; G09G 3/3648; G09G 3/3225; G09G 3/001; G02F 2001/136254
See application file for complete search history.

(56) References Cited

U.S. PATENT DOCUMENTS

| 2006/0284642 | A1* | 12/2006 | Tomita | G02F 1/136259 324/760.01 |
| 2006/0284643 | A1* | 12/2006 | Yamamoto | G09G 3/006 324/760.01 |
| 2009/0294771 | A1* | 12/2009 | Kim | G02F 1/136204 257/59 |
| 2015/0015820 | A1* | 1/2015 | Masutani | G02F 1/1309 349/42 |
| 2015/0235582 | A1* | 8/2015 | Murakami | G09G 3/3648 324/760.01 |

* cited by examiner

*Primary Examiner* — Alvaro E Fortich
*Assistant Examiner* — Zannatul Ferdous
(74) *Attorney, Agent, or Firm* — Arent Fox LLP; Michael Fainberg (57) ABSTRACT

An array substrate, a method for determining an abnormal display thereof, a display panel, and a display device are provided. The array substrate includes: a source IC in a border area of the array substrate, wherein the source IC includes a reset pin and idle output pins; a reset unit in the border area of the array substrate, wherein the reset unit includes an output terminal and input terminals, the input terminals of the reset unit are electrically connected with the idle output pins of the source IC, and the output terminal of the reset unit is electrically connected with the reset pin of the source IC; and the reset unit is configured to determine whether the array substrate displays abnormally, and if so, to reset the source IC.

14 Claims, 4 Drawing Sheets

```
┌─────────────────────────────────────────────┐
│ The reset unit receives voltage signals     │──── S601
│ output by the plurality of idle output pins │
└─────────────────────────────────────────────┘
                      │
                      ▼
┌─────────────────────────────────────────────┐
│ The reset unit determines whether the array │
│ substrate displays abnormally, according to │
│ the first threshold, the reference          │
│ electrical signal, and the voltage signals  │──── S602
│ output by the plurality of idle output pins,│
│ and when the array substrate is determined  │
│ to display abnormally, then the reset unit  │
│ transmits a rest signal to the source IC to │
│ reset the source IC                         │
└─────────────────────────────────────────────┘
```

ARRAY SUBSTRATE, METHOD FOR DETERMINING ABNORMAL DISPLAY THEREOF, DISPLAY PANEL AND DISPLAY DEVICE

CROSS-REFERENCES TO RELATED APPLICATIONS

This application claims priority to Chinese patent application No. 201810154536.7 filed on Feb. 23, 2018, which is incorporated herein by reference in its entirety.

FIELD

The present disclosure relates to the field of display technologies, and particularly to an array substrate, a method for determining an abnormal display thereof, a display panel and a display device.

BACKGROUND

While a display screen is operating normally, a source driver chip (also referred as a source IC) provides a corresponding display signal to each data line according to an operating mode of the display screen, so that each pixel unit in the display screen may receive the display signal provided on the data line corresponding to the pixel unit, and thus an image is displayed normally. However the display signal provided by the source IC may become abnormal due to a damage of the source IC, or another reason, so that the display signals provided on the respective data lines may be disordered, and thus the image may be displayed abnormally on the display panel, thus degrading a display effect thereof.

SUMMARY

In one aspect, an embodiment of the disclosure provides an array substrate. The array substrate includes a source IC arranged in a border area of the array substrate, wherein the source IC includes a reset pin and a plurality of idle output pins; a reset unit arranged in the border area of the array substrate, wherein the reset unit includes an output terminal and a plurality of input terminals, the input terminals of the reset unit are electrically connected with the idle output pins of the source IC in a one-to-one manner, and the output terminal of the reset unit is electrically connected with the reset pin of the source IC; and the reset unit is configured to determine whether the array substrate displays abnormally, according to a first threshold, a reference electrical signal, and voltage signals output by the plurality of idle output pins, and when the array substrate is determined to display abnormally, to reset the source IC, wherein the first threshold is less than or equal to the number of idle output pins.

In a possible implementation, in the array substrate above according to the embodiment of the disclosure, the reset unit includes a plurality of comparators and a collector, wherein each of the comparators includes a first input terminal and a second input terminal, the first input terminal of each of comparators is electrically connected with one of the idle output pins, the second input terminal of each of the comparators is connected with the reference electrical signal, and an output terminal of each of the comparators is electrically connected with an input terminal of the collector; and an output terminal of the collector is the output terminal of the reset unit.

In a possible implementation, in the array substrate above according to the embodiment of the disclosure, the first input terminal of each of the comparators is electrically connected with one of the idle output pins through a wire.

In a possible implementation, in the array substrate above according to the embodiment of the disclosure, the number of comparators is equal to the number of the idle output pins.

In a possible implementation, in the array substrate above according to the embodiment of the disclosure, the array substrate further includes a power source module arranged in the border area of the array substrate; and the source IC further includes a function pin electrically connected with a switch pin of the power source module.

In another aspect, an embodiment of the disclosure further provides a display panel including an array substrate. The array substrate includes a source IC arranged in a border area of the array substrate, wherein the source IC includes a reset pin and a plurality of idle output pins; a reset unit arranged in the border area of the array substrate, wherein the reset unit includes an output terminal and a plurality of input terminals, the input terminals of the reset unit are electrically connected with the idle output pins of the source IC in a one-to-one manner, and the output terminal of the reset unit is electrically connected with the reset pin of the source IC; and the reset unit is configured to determine whether the array substrate displays abnormally, according to a first threshold, a reference electrical signal, and voltage signals output by the plurality of idle output pins, and when the array substrate is determined to display abnormally, to reset the source IC, wherein the first threshold is less than or equal to the number of idle output pins.

In a possible implementation, in the display panel above according to the embodiment of the disclosure, the reset unit includes a plurality of comparators and a collector, wherein each of the comparators includes a first input terminal and a second input terminal, the first input terminal of each of comparators is electrically connected with one of the idle output pins, the second input terminal of each of the comparators is connected with the reference electrical signal, and an output terminal of each of the comparators is electrically connected with an input terminal of the collector; and an output terminal of the collector is the output terminal of the reset unit.

In a possible implementation, in the display panel above according to the embodiment of the disclosure, the first input terminal of each of the comparators is electrically connected with one of the idle output pins through a wire.

In a possible implementation, in the display panel above according to the embodiment of the disclosure, the number of comparators is equal to the number of the idle output pins.

In a possible implementation, in the display panel above according to the embodiment of the disclosure, the array substrate further includes a power source module arranged in the border area of the array substrate; and the source IC further includes a function pin electrically connected with a switch pin of the power source module.

In a further aspect, an embodiment of the disclosure provides a display device including the display panel above according to the above embodiment of the disclosure.

In another further aspect, an embodiment of the disclosure provides a method for determining an abnormal display of the array substrate according to any one of the embodiments above. The method includes: receiving, by the reset unit, the voltage signals output by the plurality of idle output pins; and determining, by the reset unit, whether the array substrate displays abnormally, according to the first threshold, the reference electrical signal, and the voltage signals output by the plurality of idle output pins, and when the array substrate is determined to display abnormally, then transmitting the reset signal to the source IC to reset the source IC.

In a possible implementation, in the method above according to the embodiment of the disclosure, determining, by the reset unit, whether the array substrate displays abnormally, according to the first threshold, the reference electrical signal, and the voltage signals output by the plurality of idle output pins includes: transmitting, by each of the comparators in the reset unit, a first signal to the collector upon determining that the received voltage signal output by the corresponding idle output pin is higher than the reference electrical signal, wherein the first signal indicates that the voltage signal output by the idle output pin is abnormal; and receiving and counting, by the collector, the first signals, and determining that the array substrate is displaying abnormally, upon determining that the number of first signals is more than or equal to the first threshold.

In a possible implementation, in the method above according to the embodiment of the disclosure, the method further includes: receiving, by the source IC, the reset signal, and resetting the source IC; and counting, by the source IC, the number of times that the reset signal is received, and upon determining that the number of times that the reset signal is received exceeds a preset number of times transmitting a second signal to a power source module to instruct the power source to be powered off.

DETAILED DESCRIPTION

In order to make the objects, features, and advantages of the disclosure more apparent and readily understood, the disclosure will be described below in further details with reference to the drawings and the embodiments thereof. However the exemplary embodiments can be implemented in a number of forms, but shall not be construed as being limited to the embodiments described here; and on the contrary, these embodiments are provided to make the content of the disclosure more full and complete, and to completely convey the idea of the embodiments to those skilled in the art. Same reference numerals in the drawings denote identical or similar structures, so a repeated description thereof will be omitted. All the terms as described in the disclosure to represent positions and directions will be described by way of an example with reference to the drawings, but can also be varied as needed without departing from the scope of the disclosure as claimed.

It shall be noted that specific details will be set forth in the following description to facilitate full understanding of the disclosure. However the disclosure can be embodied in a number of other embodiments than those described here, and those skilled in the art can generalize them without departing from the spirit of the disclosure. Accordingly the disclosure will not be limited to the specific embodiments to be disclosed below. For example, some words may be used in the description and the claims to refer to specific components. Those skilled in the art shall appreciate that hardware manufacturers may denominate the same component using different names. In the description and the claims, the components will not be distinguished using their different names, but will be distinguished using their different functions. For example, "include" or "comprise" or a variant thereof as referred to throughout the description and the claims is an open term, and thus shall be construed as "include but will not be limited to". Preferred embodiments of the disclosure will be described below merely for the purpose of setting forth the general principle of the disclosure, but not for limiting the scope of the disclosure thereto. The scope of the disclosure as claimed shall be as defined in the appended claims.

Embodiments of the disclosure provide an array substrate, a method for determining an abnormal display thereof, a display panel, and a display device so as to detect the abnormal display of the array substrate timely, and further avoid degrading a display effect thereof.

In both the array substrate, and the method for determining an abnormal display of the array substrate according to the embodiments of the disclosure, a hardware environment is involved in which a source IC in the array substrate is provided with idle output pins. The source IC of the array substrate is configured to provide display signals to respective pixel units in a display area of the array substrate. While the array substrate is displaying normally, the source IC provides display signals normally to the respective pixel units in the display area, but when the display signals become abnormal due to a damage of the source IC, or another reason, then this may not be detected with naked eyes timely. In view of this, a voltage signal at the idle output pine in the source IC can be detected in the embodiments of the disclosure to thereby determine whether the display signals provided by the source IC are abnormal.

Figure 1:
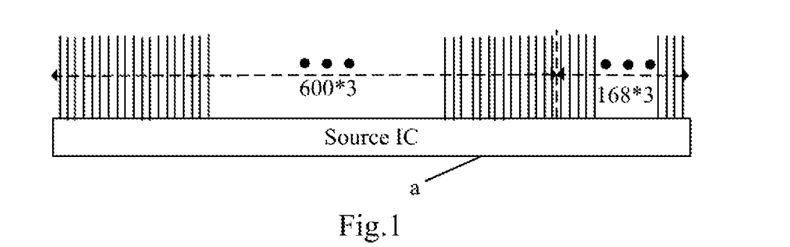
FIG. 1 is a schematic structural diagram of a source IC according to an embodiment of the disclosure.

Specifically in order to provide display signals to the pixel units in the array substrate, such a source IC may be selected that the number of output pines thereof is more than the number of data lines. For example, when the display resolution of the array substrate is 600*600, where 600*600 represents the array substrate including 600 rows of pixel units by 600 columns of pixel units, each pixel unit includes three sub-pixels, and each row of sub-pixels or each column of sub-pixels is electrically connected with the source IC through a data line, then the source IC matching with the array substrate may include at least 600*3 output pins. However a matching source IC including 600*3 output pins may not be available in a real application, so in order to enable the array substrate to display normally, a source IC including more than 600*3 output pins may be selected. For example, referring to FIG. 1, a source IC including 768*3 output pins is selected, so that the driver IC includes 504 (that is 168*3) idle output pins, where 600*3 output pins arranged on the left side of the source IC a in FIG. 1 are connected respectively with data lines, and provide display signals to 600*600 pixel units in the array substrate; and 168*3 output pins arranged on the right side in FIG. 1 are idle output pins, and not electrically connected with any data lines. When the array substrate is displaying normally, the 600*3 output pins output display signals to the pixel units, and voltage at the 168*3 idle output pins is 0 or common reference voltage; and when the array substrate is displaying abnormally, the 600*3 output pins may provide abnormal display signals, and potentials at a part of the 168*3 idle output pins may be changed. Accordingly when the display signals provided in the array substrate are abnormal, then the potentials at a part of the 168*3 idle output pins may be changed, thus indicating that the array substrate is displaying abnormally.

The array substrate, the display panel, the display device, and the method for determining a display abnormality of the array substrate according to the embodiments of the disclosure will be described below with reference to the drawings.

Figure 2:
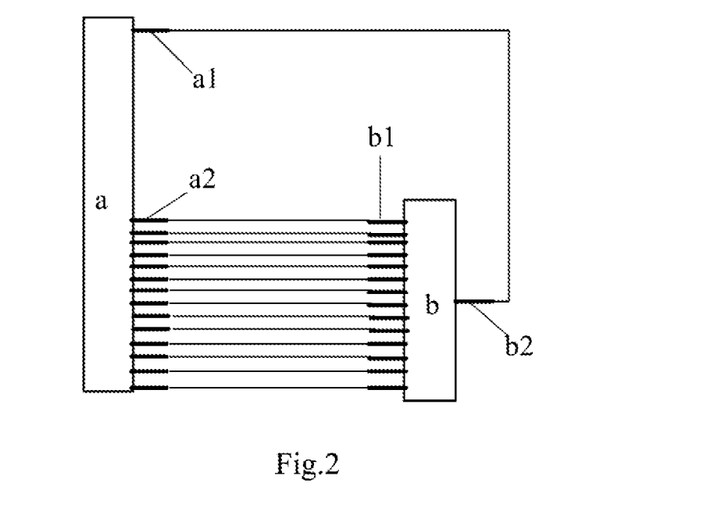
FIG. 2 is a schematic structural diagram of a first array substrate according to an embodiment of the disclosure.

Referring to FIG. 2, an array substrate according to an embodiment of the disclosure includes: a source IC a and a reset unit b arranged in a border area of the array substrate. The source IC a includes a reset pin a1 and a plurality of idle output pins a2; and the reset unit b includes an output terminal b2 and a plurality of input terminal b1, each input terminal b1 of the reset unit b is electrically connected respectively with one of the idle output pins a2, and the input terminals b1 of the reset unit b are electrically connected with the idle output pins a2 in a one-to-one manner, and the output terminal b2 of the reset unit b is electrically connected with the reset pin a1 of the source IC.

The reset unit b is configured to determine whether the array substrate displays abnormally according to a first threshold, a reference electrical signal, and voltage signals output by the plurality of idle output pins, and when the array substrate is determined display abnormally, to reset the source IC a.

It shall be noted that in the embodiment of the disclosure, the first threshold is less than or equal to the number of idle output pins. The value of the reference electrical signal may be set according to a display mode of the array substrate, and for example, when the array substrate displays normally, the voltage value of an idle output pin in the source IC is 0, so the value of the reference electrical signal may be set to 0, or when the array substrate displays normally, the voltage value of the idle output pin is 3V, so the value of the reference electrical signal may be set to 3. In the embodiment of the disclosure, the value of the reference electrical signal will not be limited to any specific value.

Specifically in the embodiment of the disclosure, the output terminal of the reset unit is connected with the reset pin of the source IC a, so when the reset unit determines that the array substrate displays abnormally, the reset unit outputs a reset signal to the source IC through the output terminal to thereby reset the source IC, so as to avoid the array substrate from displaying abnormally, which would otherwise have degraded a display effect. Of course, when the reset unit determines that the array substrate displays normally, then it does not transmit any reset signal to the source IC, so that the array substrate keeps on displaying normally.

The array substrate according to the embodiment of the disclosure includes: the source IC arranged in the border area of the array substrate, where the source IC includes the reset pin and the plurality of idle output pins; the reset unit arranged in the border area of the array substrate, where the reset unit includes the output terminal and the plurality of input terminals, the input terminals of the reset unit are electrically connected with the idle output pins of the source IC in a one-to-one manner, and the output terminal of the reset unit is electrically connected with the reset pin of the source IC; and the reset unit is configured to determine whether the array substrate displays abnormally according to the first threshold, the reference electrical signal, and the voltage signals output by the plurality of idle output pins, and when the array substrate is determined display abnormally, to reset the source IC. Accordingly in the embodiment of the disclosure, the reset unit is added to the array substrate, and the reset unit detects the potentials at the idle output pins of the source IC to determine whether the array substrate displays abnormally, to thereby detect timely that the array substrate displays abnormally. Furthermore when it is determined that the array substrate displays abnormally, the source IC is reset, thus avoiding the display effect from being degraded.

Figure 3:
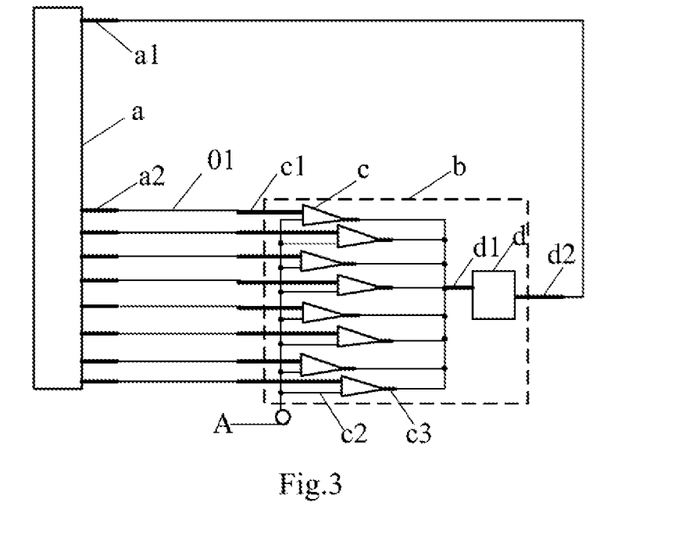
FIG. 3 is a schematic structural diagram of a second array substrate according to an embodiment of the disclosure.

In some embodiments, referring to FIG. 3, in the array substrate above, the reset unit b includes a plurality of comparators c and a collector d.

Each comparator c includes a first input terminal c1 and a second input terminal c2, the first input terminal c1 of each comparator c is electrically connected with one of the idle output pins a2, the second input terminal c2 of each comparator c is connected with the reference electrical signal A, and an output terminal c3 of each comparator is electrically connected with an input terminal d1 of the collector d; and an output terminal d2 of the collector d is the output terminal of the reset unit b.

It shall be noted that in the embodiment of the disclosure, the first input terminals c1 of the comparators c are the input terminals of the reset unit b respectively, so the first input terminals c1 are electrically connected respectively with the idle output pins a2 through wires 01.

Specifically the first input terminal of each comparator c receives the voltage signal of one of the idle output pins a2, the second input terminal of each comparator c receives the reference electrical signal A, and each idle output pin a2 is connected with different one of the comparators c. When some comparator c determines that the voltage signal of the corresponding idle output pin a2 is higher than the reference electrical signal A, it is determined that the voltage signal of the corresponding idle output pin a2 is abnormal, so the comparator c outputs a signal to the collector d to indicate that the voltage signal of the corresponding idle output pin a2 is abnormal. For example, when the comparator c determines that the voltage signal of the corresponding idle output pin a2 is abnormal, then it outputs 1, and when the comparator c determines that the voltage signal of the corresponding idle output pin a2 is normal, then it outputs 0. Specifically the signal indicating that the voltage signal of the corresponding idle output pin a2 is abnormal may be defined as appropriate, although the embodiment of the disclosure will not be limited thereto.

The collector d in the reset unit b receives the signals output at the output terminals of the plurality of comparators c, determines the number of signals, output at the output terminals of the comparators c and indicating that the voltage signals at the idle output pins a2 are abnormal, and when it is determined that the abnormality signals output by a plurality of comparators c are received, and the number of signals indicating that the voltage signals at the idle output pins a2 are abnormal are more than or equal to the first threshold, then it is determined that the array substrate displays abnormally. For example, when a comparator c determines that a voltage signal of a corresponding idle output pin a2 is abnormal, then it outputs 1, and when the comparator c determines that the voltage signal of the corresponding idle output pin a2 is normal, then it outputs 0; and when the number of 1's received by the collector d is more than or equal to the first threshold, then it determines that the array substrate displays abnormally, and outputs the reset signal to the source IC.

It shall be noted that the comparators in the embodiment of the disclosure may be any devices capable of comparing, and of outputting different signals according to a comparison result; and the collector in the embodiment of the disclosure may be any device capable of counting and comparing, and of outputting different signals according to a comparison result, although the embodiment of the disclosure will not be limited thereto.

In some embodiments, in the array substrate above, the number of comparators c is equal to the number of idle output pins a2. In the embodiment of the disclosure, the number of comparators c in the reset unit b is the same as the number of idle output pins a2, so that each idle output pin a2 corresponds to one of the comparators c, and the comparator c detects the voltage signal of the idle output pin a2 to determine whether the voltage signal of the idle output pin a2 is abnormal.

In some embodiments, when the first input terminals c1 of the comparators c are electrically connected with the idle output pins a2, in order to further enable the comparators c to be electrically connected with the idle output pins a2 without being restrained by their distances, referring to FIG. 3, the first input terminals c1 of the comparators c are electrically connected with the idle output pins a2 through the wires 01. Each comparator c corresponds to one of the wires 01, and the wires 01 electrically connected with the different comparators c are insulated from each other.

Figure 4:
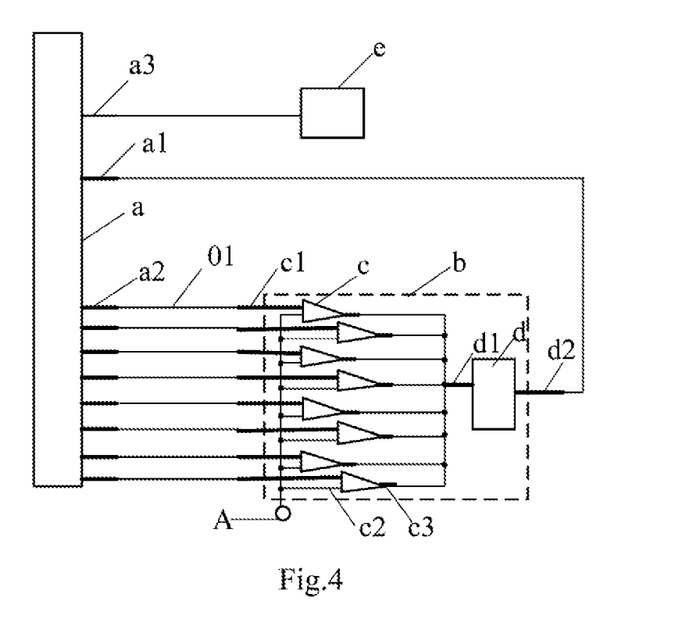
FIG. 4 is a schematic structural diagram of a third array substrate according to an embodiment of the disclosure.

In some embodiments, referring to FIG. 4, in the array substrate above, the array substrate further includes a power source module e arranged in the border area of the array substrate. The source IC a further includes a function pin a3 electrically connected with a switch pin of the power source module e.

In order to avoid the display effect of the array substrate from being degraded, and even some device from being damaged, due to a display abnormality, in the embodiment of the disclosure, the source IC a may be further electrically connected with the power source module e, so that when the source IC a determines that it would be of no help even if it were reset, the power source is powered off directly to protect the array substrate.

It shall be noted that for the function pin of the source IC a in the embodiment of the disclosure, a pin may be added to the source IC as the function pin, or an idle pin in the source IC a may be served as the function pin, although the embodiment of the disclosure will not be limited thereto.

Figure 5:
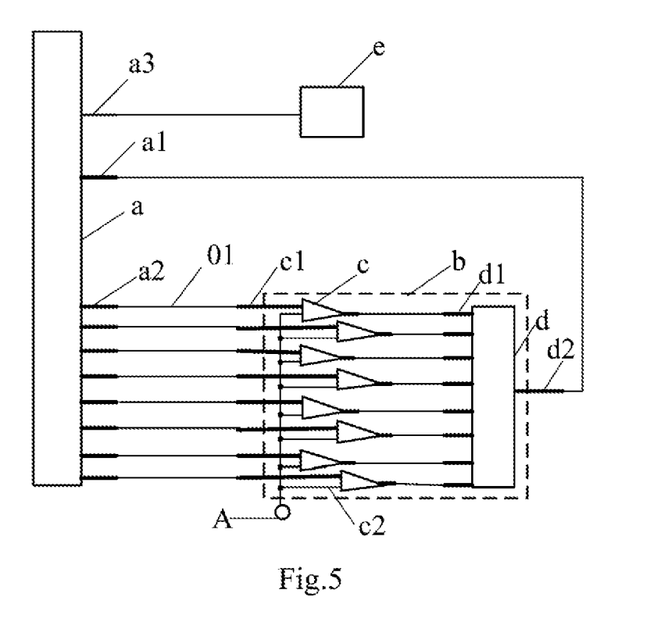
FIG. 5 is a schematic structural diagram of a fourth array substrate according to an embodiment of the disclosure.

In the embodiments of the disclosure, the plurality of comparators or the collector are or is arranged in the border area of the array substrate. When the plurality of comparators are connected respectively with the idle output pins, the connecting wires are arranged in the border area, and insulated from the other electrical signal lines to thereby avoid their mutual interference with the other electrical signal lines in the border area. The comparators and the collector may be connected in any appropriate manner, and of any appropriate selected types, in the embodiments of the disclosure. In the embodiments above of the disclosure, FIG. 2 to FIG. 4 are only schematic diagrams of the connection relationships between the respective pins, but they will not be limited to the structures according to the embodiments above of the disclosure. For example, referring to FIG. 5, the collector d in the reset unit b may include a plurality of input terminals d1 to receive signals output at the output terminals c3 of the comparators c respectively.

Figure 6:
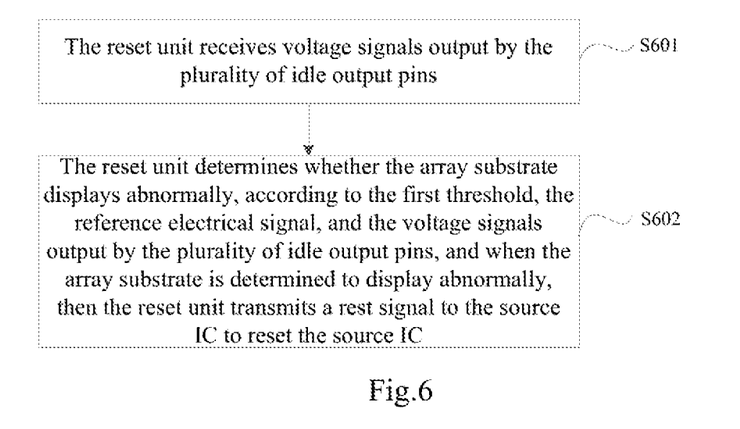
FIG. 6 is a schematic flow chart of a method for determining an abnormal display of an array substrate according to an embodiment of the disclosure.

Based upon the same inventive idea, referring to FIG. 6, an embodiment of the disclosure further provides a method for determining an abnormal display of the array substrate above, the method includes the following steps.

In the step S601, the reset unit receives voltage signals output by the plurality of idle output pins.

In the step S602, the reset unit determines whether the array substrate displays abnormally, according to the first threshold, the reference electrical signal, and the voltage signals output by the plurality of idle output pins, and when the array substrate is determined to display abnormally, then the reset unit transmits a reset signal to the source IC to reset the source IC.

Specifically in the method for determining an abnormal display of an array substrate according to the embodiment of the disclosure, the reset unit detects the potentials at the idle output pins in the source IC to determine whether the array substrate displays abnormally, to thereby detect timely that the array substrate displays abnormally. Furthermore when it is determined that the array substrate displays abnormally, the source IC is reset, thus avoiding the display effect from being degraded.

It shall be noted that when the reset unit determines that the array substrate doesn't display abnormally, according to the first threshold, the reference electrical signal, and the voltage signals output by the plurality of idle output pins, then it may transmit a normal display signal to the source IC, or may not transmit any signal to the source IC.

The reset unit in the embodiment of the disclosure transmits the reset signal to the source IC as follows: the reset unit transmits the reset signal to the reset pin of the source IC. For example, when the array substrate displays abnormally, then the reset unit transmits the reset signal to the reset pin, where the reset signal may be 1; otherwise, the reset unit transmits 0 to the reset pin. Of course, the reset signal may be embodied differently, although the embodiment of the disclosure will not be limited thereto.

In some embodiments, in the method above, the reset unit determines whether the array substrate displays abnormally, according to the first threshold, the reference electrical signal, and the voltage signals output by the plurality of idle output pins in the step S602 as follows: each comparator in the reset unit transmits a first signal to the collector upon determining that the received voltage signal output by the corresponding idle output pin is higher than the reference electrical signal, where the first signal indicates that the voltage signal output by the idle output pin is abnormal; and the collector receives and counts the first signals, and determines that the array substrate displays abnormally, upon determining that the number of first signals is more than or equal to the first threshold.

Specifically when the array substrate displays, the voltage signal(s) at any idle output pin(s) in the source IC may be changed due to a damage of the one or more idle output pin(s) or another resource, but this condition may not really reflect the abnormal display signals in the array substrate. In view of this, in order to further avoid the source IC from being reset due to an abnormal potential at some idle output pin, it is further determined according to preset criterions in the reset unit whether the array substrate displays abnormally in the embodiment of the disclosure, where the criterions include a first criterion that the comparators detect the voltage signals of the respective idle output pins, and a second criterion that the collector detects abnormalities of a plurality of idle output pins, and when both the first and second criterions are satisfied, it is determined that the array substrate displays abnormally.

For example, when a comparator determines that a voltage signal of an idle output pin is higher than the reference electrical signal, then it transmits the first signal; otherwise, it transmits a third signal to indicate that the idle output pin is not abnormal. The first signal may be 1, and the third signal may be 0, or the first signal may be 0, and the third signal may be 1. Alternatively when a comparator determines that a voltage signal of an idle output pin is higher than the reference electrical signal, then it transmits the first signal; otherwise, it doesn't transmit any signal.

In some embodiments of the disclosure, in the method above, the method further includes: the source IC receives the reset signal and is reset; the source IC counts the number of times that the reset signal is received, and transmits a second signal to a power source module through a function pin to instruct the power source to be powered off, upon determining that the number of times that the reset signal is received exceeds a preset number of times.

Specifically in order to further protect the array substrate and fix up an abnormal display thereof, when the number of times that the array substrate displays abnormally does not exceed a preset number of times, then the array substrate may display abnormally because the source IC has been operating for such a long time period that the display signals are disordered, so the abnormal display may be fixed up by resetting the source IC. When the number of times that the array substrate displays abnormally exceeds the preset number of times, then it may be determined that the array substrate can not be alleviated from displaying abnormally, by resetting the source IC, but the array substrate may display abnormally really due to a damage of the source IC, so in order to avoid the array substrate from displaying abnormally, which would otherwise have degraded the display effect, the power source of the array substrate may be powered off directly upon determining that it would be of no help even if the source IC is reset.

In some embodiments of the disclosure, in the method above, the first threshold is less than or equal to the number of idle output pins.

The method for determining an abnormal display of an array substrate according to the embodiment of the disclosure will be described below in details with reference to a flow chart.

Figure 7:
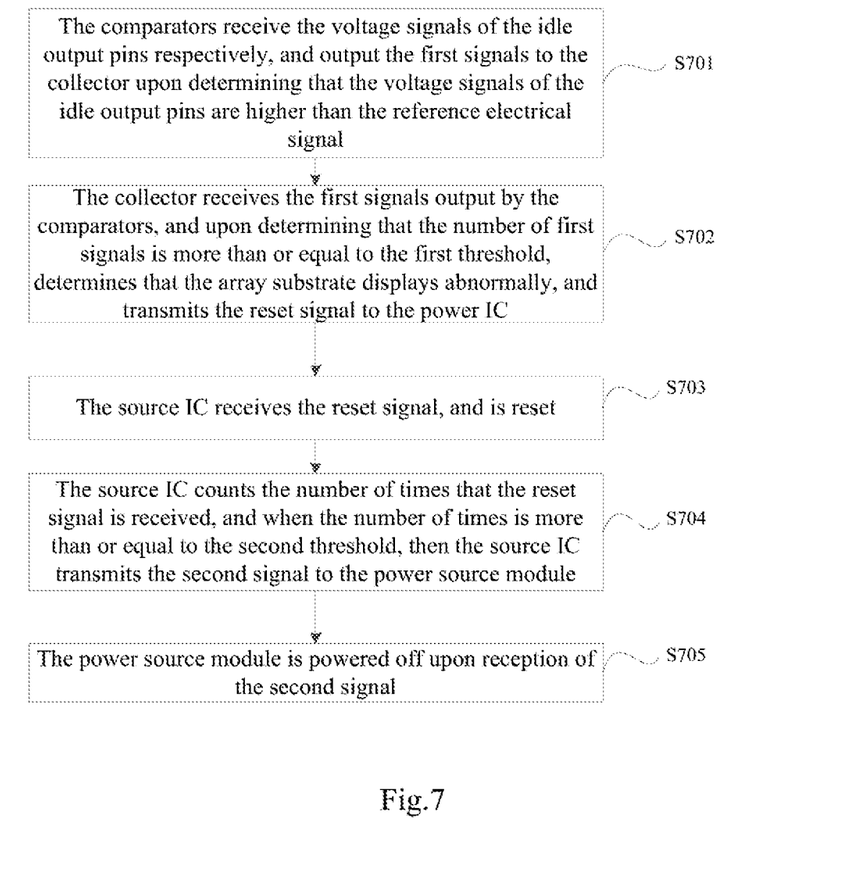
FIG. 7 is a flow chart of a method for determining an abnormal display of an array substrate according to an embodiment of the disclosure.

Referring to FIG. 7, the method for determining an abnormal display of an array substrate includes the following steps.

In the step S701, the comparators receive the voltage signals of the idle output pins respectively, and output the first signals to the collector upon determining that the voltage signals of the idle output pins are higher than the reference electrical signal.

In the step S702, the collector receives the first signals output by the comparators, and upon determining that the number of first signals is more than or equal to the first threshold, determines that the array substrate displays abnormally and transmits the reset signal to the power IC, In the step S703, the source IC receives the reset signal, and is reset.

In the step S704, the source IC counts the number of times that the reset signal is received, and when the number of times is more than or equal to the second threshold, then the source IC transmits the second signal to the power source module.

In the step S705, the power source module is powered off upon reception of the second signal.

Based upon the same inventive idea, an embodiment of the disclosure further provides a display panel including the array substrate above according to the embodiment of the disclosure. The display panel may be a liquid crystal display or an OLED display panel. Reference can be made to the embodiment of the array substrate above for an embodiment of the display panel, so a repeated description thereof will be omitted here.

Based upon the same inventive idea, an embodiment of the disclosure further provides a display device including the display panel above according to the embodiment of the disclosure. The display device may be a mobile phone, a tablet computer, a TV set, a monitor, a notebook computer, a digital photo frame, a navigator, or any other product or component capable of displaying. Reference can be made to the embodiment of the array substrate above for an embodiment of the display device, so a repeated description thereof will be omitted here.

The array substrate according to the embodiment of the disclosure includes: the source IC arranged in the border area of the array substrate, where the source IC includes the reset pin and the plurality of idle output pins; the reset unit arranged in the bezel area of the array substrate, where the reset unit includes the output terminal and the plurality of input terminals, the input terminals of the reset unit are electrically connected with the idle output pins of the source IC in a one-to-one manner, and the output terminal of the reset unit is electrically connected with the reset pin of the source IC; and the reset unit is configured to determine whether the array substrate displays abnormally, according to the first threshold, the reference electrical signal, and the voltage signals output by the plurality of idle output pins, and when the array substrate is determined to display abnormally, to reset the source IC. Accordingly in the embodiment of the disclosure, the reset unit is added to the array substrate, and the reset unit detects the potentials at the idle output pins of the source IC to determine whether the array substrate displays abnormally, to thereby detect timely that the array substrate displays abnormally; and furthermore when it is determined that the array substrate displays abnormally, the source IC is reset, thus avoiding the display effect from being degraded.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. An array substrate, comprising: a source IC (Integrated Circuit) arranged in a border area of the array substrate, wherein the source IC comprises a reset pin and a plurality of idle output pins; and a reset unit arranged in the border area of the array substrate, wherein the reset unit comprises an output terminal and a plurality of input terminals, the input terminals of the reset unit are electrically connected with the plurality of idle output pins of the source IC in a one-to-one manner, and the output terminal of the reset unit is electrically connected with the reset pin of the source IC; the reset unit is configured to determine whether the array substrate displays abnormally, according to a first threshold, a reference electrical signal, and voltage signals output by the plurality of idle output pins, and when the array substrate is determined to display abnormally, to reset the source IC, wherein the first threshold is less than or equal to a number of plurality of idle output pins.

2. The array substrate according to claim 1, wherein the reset unit comprises a plurality of comparators and a collector, wherein:

each of the plurality of comparators comprises a first input terminal and a second input terminal, the first input terminal of each of the comparators is electrically connected with one of the idle output pins, the second input terminal of each of the comparators is connected with the reference electrical signal, and an output terminal of each of the comparators is electrically connected with an input terminal of the collector; and an output terminal of the collector is the output terminal of the reset unit.

3. The array substrate according to claim 2, wherein the first input terminal of each comparator of the plurality of comparators is electrically connected with one of the plurality of idle output pins through a wire.

4. The array substrate according to claim 2, wherein a number of the plurality of comparators is equal to the number of the plurality of idle output pins.

5. The array substrate according to claim 1, wherein the array substrate further comprises a power source module arranged in the border area of the array substrate; and the source IC further comprises a function pin electrically connected with a switch pin of the power source module.

6. A display panel, comprising an array substrate, wherein the array substrate comprises: a source IC (Integrated Circuit) arranged in a border area of the array substrate, wherein the source IC comprises a reset pin and a plurality of idle output pins; and a reset unit arranged in the border area of the array substrate, wherein the reset unit comprises an output terminal and a plurality of input terminals, the input terminals of the reset unit are electrically connected with the plurality of idle output pins of the source IC in a one-to-one manner, and the output terminal of the reset unit is electrically connected with the reset pin of the source IC; the reset unit is configured to determine whether the array substrate displays abnormally, according to a first threshold, a reference electrical signal, and voltage signals output by the plurality of idle output pins, and when the array substrate is determined to display abnormally, to reset the source IC, wherein the first threshold is less than or equal to a number of plurality of idle output pins.

7. The display panel according to claim 6, wherein the reset unit comprises a plurality of comparators and a collector, wherein:

each of the comparators comprises a first input terminal and a second input terminal, the first input terminal of each of the comparators is electrically connected with one of the idle output pins, the second input terminal of each of the comparators is connected with the reference electrical signal, and an output terminal of each of the comparators is electrically connected with an input terminal of the collector; and an output terminal of the collector is the output terminal of the reset unit.

8. The display panel according to claim 7, wherein the first input terminal of each of the comparators is electrically connected with one of the idle output pins through a wire.

9. The display panel according to claim 7, wherein a number of the plurality of comparators is equal to the number of the idle output pins.

10. The display panel according to claim 6, wherein the array substrate further comprises a power source module arranged in the border area of the array substrate; and the source IC further comprises a function pin electrically connected with a switch pin of the power source module.

11. A display device, comprising the display panel according to claim 6.

12. A method for determining an abnormal display of the array substrate according to claim 1, the method comprising:

receiving, by the reset unit, the voltage signals output by the plurality of idle output pins; and determining, by the reset unit, whether the array substrate displays abnormally, according to the first threshold, the reference electrical signal, and the voltage signals output by the plurality of idle output pins, and when the array substrate is determined to display abnormally, then transmitting a reset signal to the source IC to reset the source IC.

13. The method according to claim 12, wherein determining, by the reset unit, whether the array substrate displays abnormally, according to the first threshold, the reference electrical signal, and the voltage signals output by the plurality of idle output pins comprises: transmitting, by each comparator of a plurality of comparators in the reset unit, a first signal to a collector upon determining that the received voltage signals output by a corresponding idle output pin is higher than the reference electrical signal, wherein the first signal indicates that the voltage signals output by the corresponding idle output pin is abnormal; and receiving and counting, by the collector, a number first signals, and determining that the array substrate displays abnormally upon determining that the number of first signals is more than or equal to the first threshold.

14. The method according to claim 12, further comprising: receiving, by the source IC, the reset signal, and resetting the source IC; and counting, by the source IC, a number of times that the reset signal is received, and upon determining that the number of times that the reset signal is received exceeds a preset number of times, transmitting a second signal to a power source module to instruct a power source to be powered off.

* * * * *